United States Patent Office 3,056,763
Patented Oct. 2, 1962

3,056,763
NITROGEN-CONTAINING EPOXY RESINS
Walter E. Kramer, Niles, and Louis A. Joo, Crystal Lake, Ill., assignors to The Pure Oil Company, Chicago, Ill., a corporation of Ohio
No Drawing. Filed Sept. 27, 1960, Ser. No. 58,638
14 Claims. (Cl. 260—77.5)

This invention relates to new and useful improvements in epoxy resins and more particularly, to a novel nitrogen-containing epoxy monomer and to the method of preparation.

Epoxy resins have assumed increasing importance in the plastics industry during recent years because of high thermal and chemical stability, and high tensile and impact strength. In addition, the epoxy resins are very versatile because their pot life can be controlled over a wide range by judicious selection of the cross-linking reagent, or the catalyst used (in the case of a homopolymerized resin).

The simplest epoxide, ethylene oxide, has been known for more than one hundred years. It has also been known for many years that ethylene oxide could be polymerized catalytically or by reaction with difunctional compounds to produce polymers of various types. Diepoxy compounds have been known for more than sixty years. The practical use of epoxy polymers came first with their application as adhesives during World War II. Since that time, the development of new epoxy resins and new uses for these resins has been gradual, although in recent years the use of epoxy resins has accelerated rapidly.

Epoxy resins are prepared from monomers having reactive epoxide groups in the resin structure. The epoxy monomers are available commercially both in liquid and solid forms, and are polymerized either by a process of catalytic homopolymerization, or copolymerization with hardness or cross-linking reagents which are polyfunctional compounds, such as glycols, polyglycols, polyamines, polyamides, and carboxylic acid anhydrides. The resins which are produced by the copolymerization process are cross-linked resins of the thermosetting type and are characterized by high chemical and thermal stability, and high tensile and impact strength.

One of the objects of this invention is to provide a new and improved epoxy monomer for use in the preparation of epoxy resins.

Another object of this invention is to provide an improved method of preparation of epoxy monomers.

A feature of this invention is the provision of an improved epoxy monomer which is a diepoxy ester of a difunctional acid derived from a heterocyclic aromatic amine.

Another feature of this invention is the provision of an improved epoxy monomer which is the diglycidyl ester of 4,4'-tetrahydrodipyridyldicarbamic acid, and derivatives or analogues thereof, as well as resins derived from the epoxy monomer.

Another feature of this invention is the provision of an improved process for the preparation of epoxy monomers in which a disodium salt of a difunctional acid, produced by carbonation of the reaction product of sodium with an aromatic heterocyclic amine, such as pyridine, quinoline, and acridine, is reacted with epichlorohydrin or analogous epoxy halogenated compounds.

Another feature of this invention is the provision of an improved process for the preparation of epoxy monomers in which the disodium salt of a difunctional acid, produced by carbonation of the reaction product of sodium with an aromatic, heterocyclic amine, such as pyridine, quinoline, or acridine, is reacted with an alkenyl monohalide to produce an unsaturated ester, and the resulting ester subjected to peroxidation to produce a diepoxy ester.

Other objects and features of this invention will become apparent from time to time throughout the specification and claims.

In the copending application of Walter E. Kramer, Louis A. Joo, and Robert M. Haines, Serial No. 28,866, filed May 13, 1960, there is described a novel class of compounds of the formula

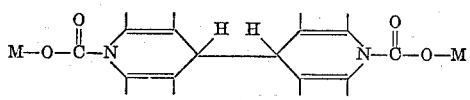

where M is an alkali metal, and the nuclei

are derived from a heterocyclic aromatic amine. This invention is based upon our discovery that novel epoxy compounds can be produced by reacting the alkali-metal salts described above with halogenated epoxy compounds, such as epichlorohydrin, or with alkenyl monohalides (which produce dialkenyl esters which are peroxidized to diepoxy esters). The novel epoxy monomers which are produced in accordance with this invention can be catalytically homopolymerized using boron trifluoride complex, $BF_3 \cdot (CH_3)_3N$, or other epoxy polymerization catalysts. The novel epoxy monomers of this invention may also be copolymerized with cross-linking reagents or hardeners, such as aliphatic and aromatic polyamines, glycols, polyglycols, polybasic acids, polyhydric phenols, acid anhydrides, amino alcohols, and, in general, any organic compound having two active hydrogens which are reactive with the epoxy group, or oxirane ring.

In the copending application of Walter E. Kramer et al., Serial No. 28,866, filed May 13, 1960, a more complete description is given of the novel difunctional acid salts from which the novel epoxy monomers of this invention are derived. In the Kramer et al. application, it is disclosed that a dispersion of an alkali metal, such as sodium, lithium, potassium, or a sodium-potassium alloy, may be formed in an inert solvent, preferably mineral oil, such as white oil, and the dispersion added to an aromatic heterocyclic amine. The amines which can be reacted in this manner include pyridine, quinoline, acridine, and derivatives or analogues thereof containing only inert substituents, e.g., picoline, lutidine, esters or salts of nicotinic acid, alkyl- and polyalkyl- or aryl-substituted derivatives of quinoline, acridine, or pyridine, such as 2-benzylpyridine, 2,3,6-collidine, etc. The reaction of the alkali metal with the heterocyclic aromatic amine is carried out at a relatively low temperature, e.g., —50° to +100° C., preferably —25° to +100° C. under these reaction conditions, the alkali metal reacts with the aromatic heterocyclic amine by addition at the nitrogen atom, with the result that the aromatic amine dimerizes and there is formed a dialkali-metal amide. In the case of the reaction of pyridine with sodium, the reaction takes place as follows:

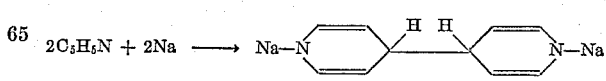

When sodium is reacted with other aromatic amines of the type disclosed herein, the sodium (or other alkali metal) adds at the nitrogen atom and the compound dimerizes at the opposite end of the molecule. After the alkali-metal diamide of the aromatic amine is formed, it is then reacted with carbon dioxide in solid or gaseous form to produce a dialkali-metal salt of the formula

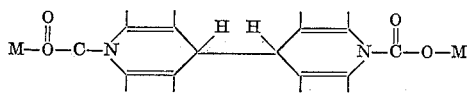

where M is an alkali metal, and the nuclei

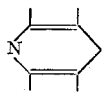

are derived from a heterocyclic aromatic amine. It is preferred to carry out the reaction using solid carbon dioxide in order to maintain the temperature of reaction low enough to prevent the formation of undesired by-products. The reaction is preferably carried out in the temperature range from —100° to +50° C. While solid carbon dioxide is preferred, it is possible to carry out the reaction using cool, gaseous carbon dioxide. The alkali-metal salt which is formed by reaction of the dialkali-metal diamide with carbon dioxide is stable and is recovered in relatively pure form from the reaction mixture by filtration, washing, and drying techniques.

In preparing the novel epoxy compounds of this invention, the dialkali-metal salt of the formula

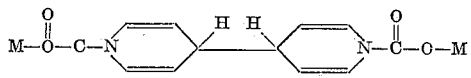

is reacted with an epoxy halogenated compound, such as epichlorohydrin, or alkyl or aryl derivatives thereof, to produce diepoxy esters of the formula

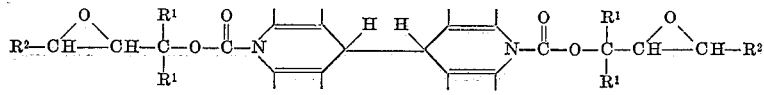

where the nuclei

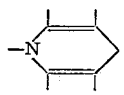

are derived from a heterocyclic aromatic amine and have the free valences satisfied by inert substituents, $R^1$ is selected from the group consisting of hydrogen, alkyl, aryl, alkaryl, aralkyl, and cycloalkyl radicals, and $R^2$ is selected from the group consisting of hydrogen, alkyl, aryl, aralkyl, alkaryl, and cycloalkyl radicals. The diepoxy esters may also be prepared by reacting the alkali-metal salt described above with an alkenyl monohalide, such as allyl chloride, to produce a dialkenyl ester which is then peroxidized, e.g., using peracetic acid, to produce the desired diepoxy ester.

The following non-limiting examples are illustrative of the scope of this invention.

*Example I*

A flask fitted with a reflux condenser and stirrer was charged with 600 g. of epichlorohydrin and 141 g. of disodium 4,4'-tetrahydrodipyridyl dicarbamate,

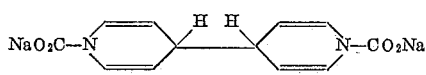

The resulting mixture was heated at reflux temperature for 24 hours and then cooled. Then ether was added to the mixture to dissolve the organic portion and the solution was filtered to remove the by-product salt formed during the reaction. Thereafter, the ether and excess epichlorohydrin were removed sequentially by distillation, leaving the diglycidyl ester in good yield as residue.

The diglycidyl ester which is obtained in this manner can be polymerized in the presence of a boron-trifluoride-trimethylamine complex as catalyst. This diglycidyl ester may also be copolymerized with polyfunctional hardeners or cross-linking reagents. The diesters which are prepared in the above-identified process react readily with polyfunctional materials and are copolymerized to a cross-linked, solid, plastic structure. For example, when the diglycidyl ester prepared above is reacted with a stoichiometric equivalent of ethylene diamine at room temperature for 2 to 10 hours, a very hard, infusible resin is obtained. This resin may be applied as a coating in solution in acetone, or methyl ethyl ketone, as a surface coating for wood, glass, masonry, aluminum, or steel. When the solution is prepared and the cross-linking reagent added, the liquid can be applied in the same manner as paints and plastic coatings, and sets to a hard finish on the material to which it is applied. The diglycidyl esters prepared in accordance with this example may be used with powdered or fibrous fillers, may be used for laminating paper, cloth, wood, or metal, or may be used in adhesive compositions. When these diglycidyl esters are mixed with a stoichiometric equivalent of p-phenylene diamine, resorcinol, succinic anhydride, or succinic acid, epoxy resins are obtained which have excellent chemical and thermal stability, and high tensile and impact strengths. The diglycidyl esters prepared in accordance with these examples may also be reacted with other cross-linking reagents or hardeners used in the preparation of other epoxy resins. Cross-linking reagents or hardeners which may be used include aliphatic and aromatic polyamines, such as ethylene diamine, diethylene triamine, triethylene tetramine, propylene diamine, pentamethylene diamine, hexamethylene diamine, p-phenylene diamine, p,p'-diaminodiphenyl, and naphthalene diamine; polyhydric alcohols, such as $C_1$–$C_{30}$ glycols, glycerols, erythritols, and pentaerythritols; polyhydric phenols, such as resorcinol, salicyl alcohol, and bisphenol; polybasic acids (both mineral and organic), such as malonic acid, azelaic acid, suberic acid, and succinic acid; $C_1$–$C_{30}$ alkyl phosphonic acids; $C_1$–$C_{30}$ boronic acids; and acid anhydrides, such as succinic anhydride, malonic anhydride, suberic anhydride, etc. These cross-linking reagents or hardeners vary widely in handling characteristics, optimum curing time, and the physical properties they contribute to the cured resins. The hardeners are usually selected from this group of materials, governed by the properties desired for any specific application. The polyamine cross-linking reagents are usually reacted with epoxy monomers in a ratio of 1 mol of active hydrogen per mol of oxirane oxygen. These materials yield cross-linked structures with the amino groups linking molecules in which the oxirane rings have been opened. The amines, acids (organic and inorganic), and acid anhydrides do not ordinarily require a catalyst for the preparation of epoxy resins. The glycols and polyhydric phenols usually require a small amount of tertiary amine or other inorganic base as the catalyst. In the case of glycols, $BF_3$, $AlCl_3$, $FeCl_3$, and other "Lewis" acids are used as reaction catalysts.

*Example II*

Diglycidyl esters of 4,4'-tretrahydrodipyridyl dicarbamate may also be prepared by peroxidation of allyl esters. A reaction flask is fitted with a reflux condenser and stirrer, and charged with 2 mols of allyl chloride and 1 mol of sodium 4,4'-tetrahydrodipyridyl dicarbamate. The mixture is heated and stirred at reflux temperature for 24 hours and then cooled. The organic portion of the resulting mixture is dissolved in ether, and by-product sodium chloride is filtered out. Next, 1 mol of the diallyl ester, dissolved in ether, is chilled to 0° C. and 250 g. of 30% peracetic acid is added slowly at a rate such that the temperature of the reaction mixture is maintained at 0° C. After the peracetic acid has been added, the mixture is stirred for 2 hours and then is poured over a large volume of cracked ice. An organic layer is recovered from the resulting mixture, and is washed with ice water and dried over anhydrous sodium carbonate. Then the ether is distilled off, leaving a residue of substantially pure diglycidyl ester of 4,4'-tetrahydrodipyridyl dicarbamic acid. The diglycidyl ester is obtained in substantially quantitative yield. The diglycidyl ester which is obtained in this method is the same product as obtained in Example I and may be converted into epoxy resins using the same catalysts or cross-linking reagents described in connection with Example I.

While the foregoing examples have been used to illustrate this invention with special emphasis upon the preparation of diglycidyl esters of 4,4'-tetrahydrodipyridyl dicarbamic acid, we wish to point out that homologues of these materials can be prepared from other similar reactants. Thus, any of the alkali-metal salts which are prepared by carbonation of the alkali-metal reaction products with heterocyclic aromatic amines, as described in the aforementioned copending application of Walter E. Kramer et al., may be used to prepare epoxy monomers in the same manner as described in Examples I and II. The aromatic heterocyclic amines which may be converted to alkali-metal salts for use as starting materials for the preparation of our novel epoxy monomers are also described in the aforementioned copending application of Walter E. Kramer et al., and include pyridine, quinoline, acridine, and derivatives thereof which contain only inert substituents. Substituents on the heterocyclic amines include inert hydrocarbon substituents of all kinds, including alkyl, aryl, alkaryl, aralkyl, and cycloalkyl radicals. These heterocyclic aromatic amines react readily with alkali metals to produce a dialkali-metal diamide which is readily carbonated to form a dimetallic salt of a difunctional acid of the diamide. When any of the alkali-metal salts of these difunctional acids are reacted with an epoxy halogenated hydrocarbon, there is obtained an epoxy resin in the manner described in Examples I and II. Similarly, any of the aforementioned dialkali-metal salts can be reacted with alkenyl halides to form dialkenyl esters which can then be epoxidized by treatment with peracetic acid. The epoxy halogenated hydrocarbons which may be used in the preparation of the epoxy esters are of the formula

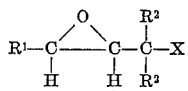

where $R^1$ is a hydrogen, alkyl, alkaryl, aryl, aralkyl, or cycloalkyl radical (preferably containing 1 to 30 carbon atoms), $R^2$ are the same or different and selected from the group consisting of hydrogen, or an alkyl, alkaryl, aryl, aralkyl, or cycloalkyl radical (preferably containing 1 to 30 carbon atoms), and X is a halogen. Specific examples of suitable compounds are:

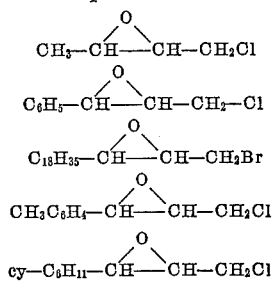

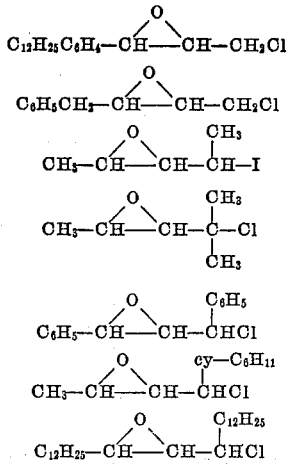

Similarly, the diesters may be prepared using any alkenyl halide (preferably containing 3 to 30 carbon atoms). Specific examples of such compounds are:

$CH_3CH{:}CHCH_2Cl$   $C_{18}H_{35}CH{:}CHCH_2Br$
$CH_2{:}CHCH_2Cl$   $CH_3C_6H_4CH{:}CHCH_2Cl$
$C_6H_5CH{:}CHCH_2Cl$   $C_{12}H_{25}C_6H_4CH{:}CHCH_2Cl$
$C_6H_5CH_2CH{:}CHCH_2Cl$   $CH_3CH{:}CHCH(CH_3)I$
$CH_3CH{:}CHC(CH_3)_2Cl$   $C_6H_5CH{:}CHCH(C_6H_5)Cl$
$\quad CH_3CH{:}CHCH(cyC_6H_{11})Cl$
$\quad C_{12}H_{25}CH{:}CHCH(C_{12}H_{25})Cl$ In preparing the dialkali-metal salts for use in this process, the conditions described in the Kramer et al. application are generally followed. In reacting the alkali-metal salts with epoxy halogenated hydrocarbons, or alkenyl halides, the reaction is generally carried out under reflux conditions, although the reaction will proceed at a reasonable rate at temperatures as low as —20° C., or as high as 200° C. (at higher temperatures, it may be necessary to carry the reaction out under pressure to prevent vaporization of reactants). Likewise, while the reaction proceeds satisfactorily in most cases without the use of solvents, it may be desirable to carry out the reaction in the presence of inert solvents or diluents, such as light hydrocarbons, hexane, benzene, toluene, kerosene, naphthas, petroleum ether, etc.

Having thus described our invention with special emphasis upon several preferred embodiments, we wish it to be understood that within the scope of the appended claims, this invention may be practiced otherwise than as specifically described.

The embodiments of the invention in which an exclusive property or privilege is claimed are defined as follows:

1. Diepoxy esters of the formula

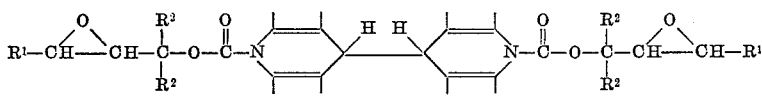

where the nuclei

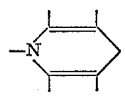

are derived from an aromatic heterocyclic amine and have the free valences satisfied by inert substituents, $R^1$ is selected from the group consisting of hydrogen, alkyl, aryl, alkaryl, aralkyl, and cycloalkyl radicals, and $R^2$ is selected fro mthe group consisting of hydrogen, alkyl, aryl, aralkyl, alkaryl, and cycloalkyl radicals.

2. Resinous homopolymers of compounds defined in claim 1.

3.

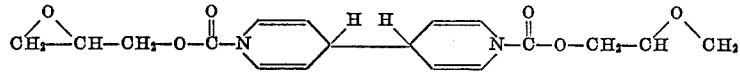

4.

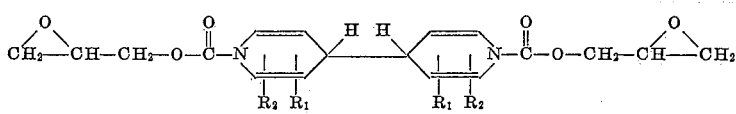

where $R_1$ and $R_2$ are lower alkyl radicals.

5.

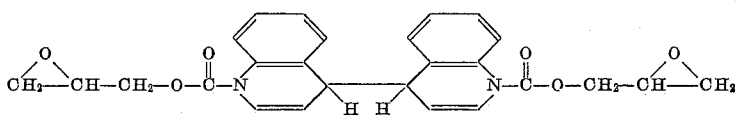

6.

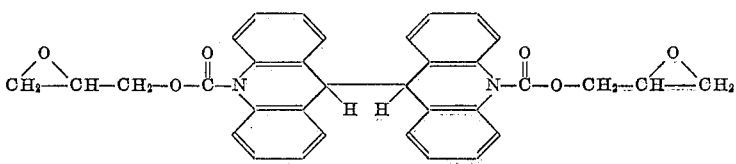

7. A polymer formed by catalytic homopolymerization of the compound defined in claim 3.

8. A polymer formed by catalytic homopolymerization of the compound defined in claim 4.

9. A method of preparing novel epoxy esters which comprises reacting an epoxychlorohydrin with a compound produced by carbonation of the reaction product of an alkali metal with an aromatic heterocyclic amine.

10. A method according to claim 9 in which epichlorohydrin is reacted with a compound produced by carbonation of the reaction product of sodium with pyridine.

11. A method of preparing novel epoxy esters which comprises reacting an alkenyl monohalide with a compound produced by carbonation of the reaction product of an alkali metal with an aromatic heterocyclic amine, and peroxidizing the resulting dialkenyl ester.

12. A method according to claim 11 in which allyl chloride is reacted with the compound produced by carbonation of the sodium-pyridine reaction product, and the resulting allyl ester is reacted with peracetic acid.

13. Compounds of the formula defined in claim 1 in which the amine from which the nitrogen-containing nuclei are derived is an aromatic heterocyclic amine selected from the group consisting of pyridine, acridine, quinoline, and derivatives thereof containing hydrocarbon substituents.

14. A method according to claim 9 in which the aromatic heterocyclic amine is selected from the group consisting of pyridine, quinoline, acridine, and derivatives thereof containing hydrocarbon substituents.

References Cited in the file of this patent

UNITED STATES PATENTS 2,830,038    Pattison _____ Apr. 8, 1958